United States Patent [19]

Hoshino et al.

[11] Patent Number: 5,583,333
[45] Date of Patent: Dec. 10, 1996

[54] CHECKING OBJECTS INCLUDING BISTABLE MAGNETIC DEVICES, TO BE CHECKED FOR AUTHENTICITY

[75] Inventors: Hidekazu Hoshino; Tatsuya Kurihara, both of Yokohama, Japan

[73] Assignee: NHK Spring Co., Ltd., Yokohama, Japan

[21] Appl. No.: 461,247

[22] Filed: Jun. 5, 1995

Related U.S. Application Data

[63] Continuation of Ser. No. 90,792, Jul. 12, 1993, abandoned.

[30] Foreign Application Priority Data

Jul. 14, 1992 [JP] Japan .................................. 4-186845

[51] Int. Cl.[6] .................................................. G06K 19/06
[52] U.S. Cl. ........................................... 235/493; 902/28
[58] Field of Search .................................. 235/493, 487, 235/380, 449; 902/28

[56] References Cited

U.S. PATENT DOCUMENTS

| | | | |
|---|---|---|---|
| 4,081,132 | 3/1978 | Pearce . | |
| 4,094,462 | 6/1978 | Moschner | 235/449 X |
| 4,114,032 | 9/1978 | Brosow et al. | 235/493 |
| 4,138,057 | 2/1979 | Atalla | 235/380 |
| 4,218,674 | 8/1980 | Brosow et al. | 340/149 A |
| 4,450,348 | 5/1984 | Stockburger et al. | 235/380 |
| 4,527,051 | 7/1985 | Stenzel | 235/380 |
| 4,639,670 | 1/1987 | Normann | 324/260 |
| 4,660,025 | 4/1987 | Humphrey | 340/572 |
| 4,820,912 | 4/1989 | Samyn | 235/449 |
| 4,859,991 | 8/1989 | Watkins et al. | 340/572 |
| 5,204,526 | 4/1993 | Yamashita et al. | 235/493 |
| 5,434,917 | 7/1995 | Naccache et al. | 235/380 X |

FOREIGN PATENT DOCUMENTS 2471633  6/1981  France .

*Primary Examiner*—Donald T. Hajec
*Assistant Examiner*—Jeffrey R. Filipek
*Attorney, Agent, or Firm*—Frishauf, Holtz, Goodman, Langer & Chick

[57] ABSTRACT

A number of bistable magnetic devices are dispersed in a scanning region of a checking object. Each bistable magnetic device is formed of a nonmagnetic material which undergoes a drastic flux reversal attributable to the Large Barkhausen effect when subjected in succession to first and second external magnetic fields of opposite directions. A processing apparatus comprises magnetic generators for generating magnetic fields of opposite directions, a transportation mechanism for moving the checking object at constant speed, and a coil for detecting magnetic pulses, which are generated as the bistable magnetic devices are subjected to the flux reversal, as changes of electromagnetic induction voltage. A detection signal for the scanning region detected by the apparatus is converted into a cipher code and then recorded in a code indicator section of the checking object. In checking the authenticity of the object, the detection signal obtained by scanning the scanning region and a code for collation obtained by decoding the cipher code recorded in the code indicator section are compared, and it is concluded that the checking object is real when the detection signal and the collation code correspond to each other.

12 Claims, 4 Drawing Sheets

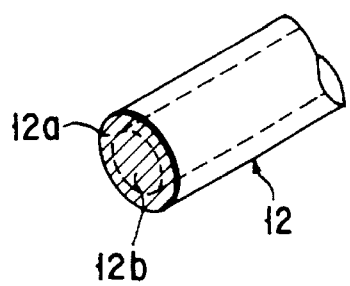
F I G. 6
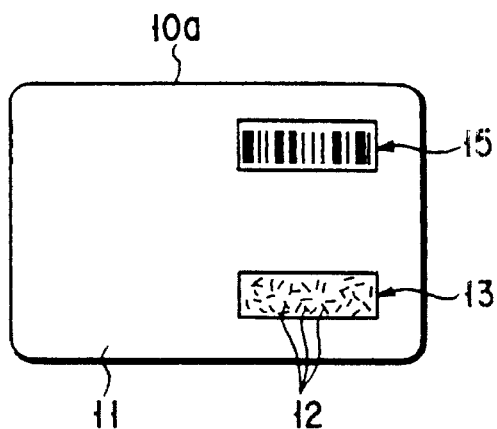
F I G. 8
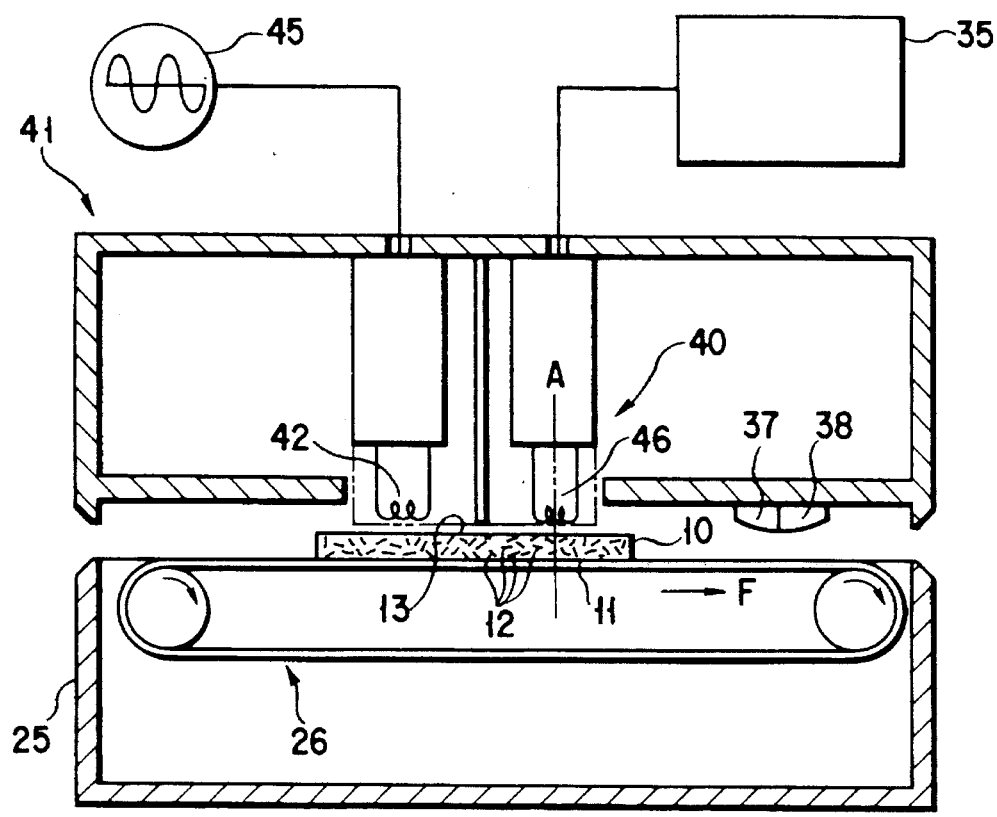
F I G. 7

CHECKING OBJECTS INCLUDING BISTABLE MAGNETIC DEVICES, TO BE CHECKED FOR AUTHENTICITY

This application is a continuation, of application Ser. No. 08/090,792, filed Jul. 12, 1993, now abandoned.

BACKGROUND OF THE INVENTION

1. Field of the Invention

The present invention relates to checking objects, such as important documents, securities, paper money, cards, art objects, etc., which should be checked for authenticity, and a method and an apparatus for checking the authenticity of the checking objects.

2. Description of the Related Art

A checking method and apparatus utilizing microwaves are conventionally known as measures for checking the authenticity of documents and the like, as described in U.S. Pat. No. 4,820,912. According to this prior art, microwaves are applied to a number of particles which are distributed at random in each document, and a proper digital mark responsive to a response microwave bundle are recorded in a suitable region of the document according to specific rules. In checking the authenticity of the document, microwaves are applied to the document, and the response microwave bundle is collated with the digital mark. The document is judged to be real when the microwave bundle and the mark agree with each other.

According to the prior art checking means based on the microwaves, however, measuring the response microwave bundle is susceptible to external noises, so that a satisfactory signal-to-noise ratio cannot be enjoyed. Used to oscillate the microwaves, moreover, the aforesaid prior art apparatus may possibly constitute a source of noises. Generally, furthermore, a microwave transmitter and receiver are large-sized, and entail high costs.

SUMMARY OF THE INVENTION

Accordingly, the object of the present invention is to provide an arrangement such that the authenticity of checking objects can be checked without producing a source of noises, by means of a low-cost compact apparatus with a high signal-to-noise ratio.

A checking object according to the present invention, developed in order to achieve the above object, comprises: a base formed of a nonmagnetic material; a scanning region located in a specific position of the base; a number of bistable magnetic devices dispersed at random in the scanning region so as to be oriented in many and unspecified directions, the bistable magnetic devices being adapted to undergo a drastic flux reversal attributable to the Large Barkhausen effect when subjected in succession to first and second external magnetic fields of opposite directions; and a code indicator section provided in part of the base so that information for a proper flux reversal responsive to the bistable magnetic devices within the scanning region is encoded and recorded in the code indicator section.

A checking method according to the present invention comprises: a manufacturing process for manufacturing the checking object; and a collating process for checking the checking object, the manufacturing process including a step of magnetizing the bistable magnetic devices within the scanning region in one direction by applying an external magnetic field of a first direction to the bistable magnetic devices and then reversing the magnetization direction of the bistable magnetic devices by applying thereto a second external magnetic field of a direction opposite to the first direction, a step of detecting a detection signal corresponding to the intensity of magnetic pulses generated as the bistable magnetic devices are subjected to the flux reversal, a step of obtaining a cipher code by enciphering the detection signal, and a step of recording the cipher code in a code indicator section of the checking object, and the collating process including the magnetization step, the detection step, a step of reading the cipher code recorded in the code indicator section, a step of reproducing a code for collation by decoding the cipher code, and a step of collating the collation code reproduced in the code reproduction step with the detection signal detected in the detection step and concluding that the checking object is real when the collation code and the detection signal correspond to each other.

A processing apparatus according to the present invention comprises: magnetic field generating means for magnetizing the bistable magnetic devices within the scanning region in one direction by applying an external magnetic field of a first direction to the bistable magnetic devices and then reversing the magnetization direction of the bistable magnetic devices by applying thereto a second external magnetic field of a direction opposite to the first direction; a transportation mechanism for moving the checking object relatively to the magnetic fields; detecting means for detecting a detection signal corresponding to the intensity of magnetic pulses generated as the bistable magnetic devices are subjected to the flux reversal; code writing means for recording a code corresponding to the detection signal in the code indicator section of the checking object; reading means for reading the code recorded in the code indicator section; and means for collating the code read by the reading means with the detection signal detected by the detecting means and concluding that the checking object is real when the read code and the detection signal correspond to each other.

Suitable materials for the bistable magnetic devices include, for example, Ni—Fe alloy, Vicalloy (Fe—Co—V alloy), Fe—Co- or Fe—B—based amorphous alloy, 6.5% Si—Fe single-crystal alloy, etc. which undergo a drastic flux reversal attributable to the Large Barkhausen effect. Each bistable magnetic device is in the form of, for example, a wire, foil, or a combination thereof.

Each bistable magnetic device may be manufactured by, for example, subjecting a vicalloy wire to a work-hardening process, such as twisting. The central portion of the work-hardened magnetic device has one residual stress, and the outer peripheral portion has another, the latter enjoying a smaller coercive force than the former. Thus, the central portion of the device constitutes a magnetically hard layer, and the outer peripheral portion a soft layer. A bistable magnetic device whose surface portion and central portion have different coercive forces can be obtained also by covering a magnetically hard magnetic material with a soft magnetic material or by subjecting a magnetic material to some heat treatment.

Let us suppose that after a strong external magnetic field of one direction is applied to the bistable magnetic devices such that its low- and high-coercivity portions are magnetized in the same direction, another external magnetic field of the opposite direction is applied such that the magnetization direction of the low-coercivity portion is reversed. If this is done, the magnetic devices undergo a drastic internal flux reversal attributable to the Large Barkhausen effect the moment the magnetic field intensity attains a certain value ($H_B$), so that steep large magnetic pulses are generated.

These magnetic pulses can be detected by means of a magnetic sensor, such as a coil or hall device, which is located in the vicinity of the bistable magnetic devices. A detection signal based on these magnetic pulses varies depending on the length and diameter of the bistable magnetic devices within the scanning region and the directions of the magnetic devices with respect to the external magnetic fields. Accordingly, the pattern of a detection signal obtained by scanning the scanning region of a fixed length is proper to each checking object. In the present invention, this detection signal is utilized for checking the authenticity of the checking object.

According to the present invention, the contents of the scanning region are detected magnetically, so that the apparatus can enjoy a smaller size and lower costs than the conventional checking means which uses microwaves. Since very steep and large magnetic pulses are generated as the scanning region is scanned, moreover, the signal-to-noise ratio is so high that the bistable magnetic devices can be detected even in a scanty magnetic field. Thus, the apparatus can avoid producing noises.

The present invention is applicable to authenticity check of papers, such as securities, paper money, important documents, etc., or plastic cards, such as ID cards, CD cards, credit cards, etc., prevention of forgery of art objects, or discrimination of the real from the false.

BRIEF DESCRIPTION OF THE DRAWINGS

FIG. 6 is a perspective view showing part of a bistable magnetic device;

FIG. 7 is a side view, partially in section, showing a processing apparatus according to another embodiment of the invention; and FIG. 8 is a plan view showing a modification of the checking object.

DETAILED DESCRIPTION OF THE PREFERRED EMBODIMENT

Referring now to FIGS. 1 to 6, an embodiment of the present invention will be described.

Figure 2:
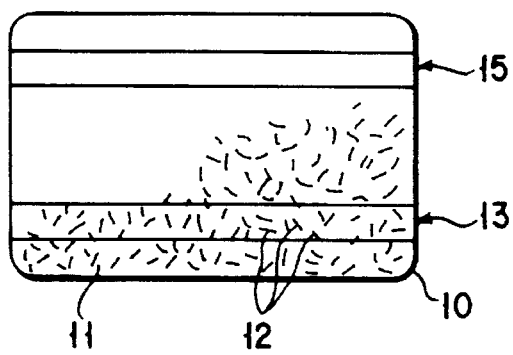
FIG. 2 is a plan view showing an example of a checking object.

As shown in FIG. 2, a number of bistable magnetic devices 12 are dispersed at random in a base 11 of a checking object 10 so as to be oriented in many and unspecified directions. The base 11 is formed of a nonmagnetic material such as paper, plastics, etc. Each magnetic device 12 may, for example, be in the form of a wire having a diameter of about 7 to 15 μm and length of about 5 to 20 mm. These devices 12 are dispersed into a specific scanning region 13 so as to enjoy a certain measure of density when the checking object 10 is manufactured. As shown in the conceptual view of FIG. 6, each bistable magnetic device is composed of the aforementioned magnetic material whose near surface portion 12a and near center portion 12b have different coercive forces.

The checking object 10 is provided with the scanning region 13 and a code indicator section 15. Information corresponding to the bistable magnetic devices 12 within the scanning region 13 are enciphered and written in the indicator section 15. The checking object 10 is scanned by means of a processing apparatus 21 which is provided with a magnetic sensor 20, as shown in FIG. 1.

The processing apparatus 21 comprises a housing 25, a transportation mechanism 26 for transporting the checking object 10 at constant speed, a first magnetic field generator 31 for initialization, used to reorient the respective magnetic fields of the bistable magnetic devices 12 within the scanning region 13, and a second magnetic field generator 32 for excitation, arranged with its polarity opposite to that of the first generator 31. The apparatus 21 further comprises a coil 33 as an example of the magnetic sensor 20, interposed between the generators 31 and 32, a controller 35 formed of a microcomputer or the like, a code writing unit 37 for recording the following cipher code in the code indicator section 15, a code reading unit 38 for reading the cipher code recorded in the indicator section 15, etc.

The sensor coil 33 is located at a point A where the intensity of magnetic fields generated by the magnetic field generators 31 and 32 is $H_B$. Although the illustrated generators 31 and 32 are permanent magnets, electromagnets may be used instead.

Figure 1:
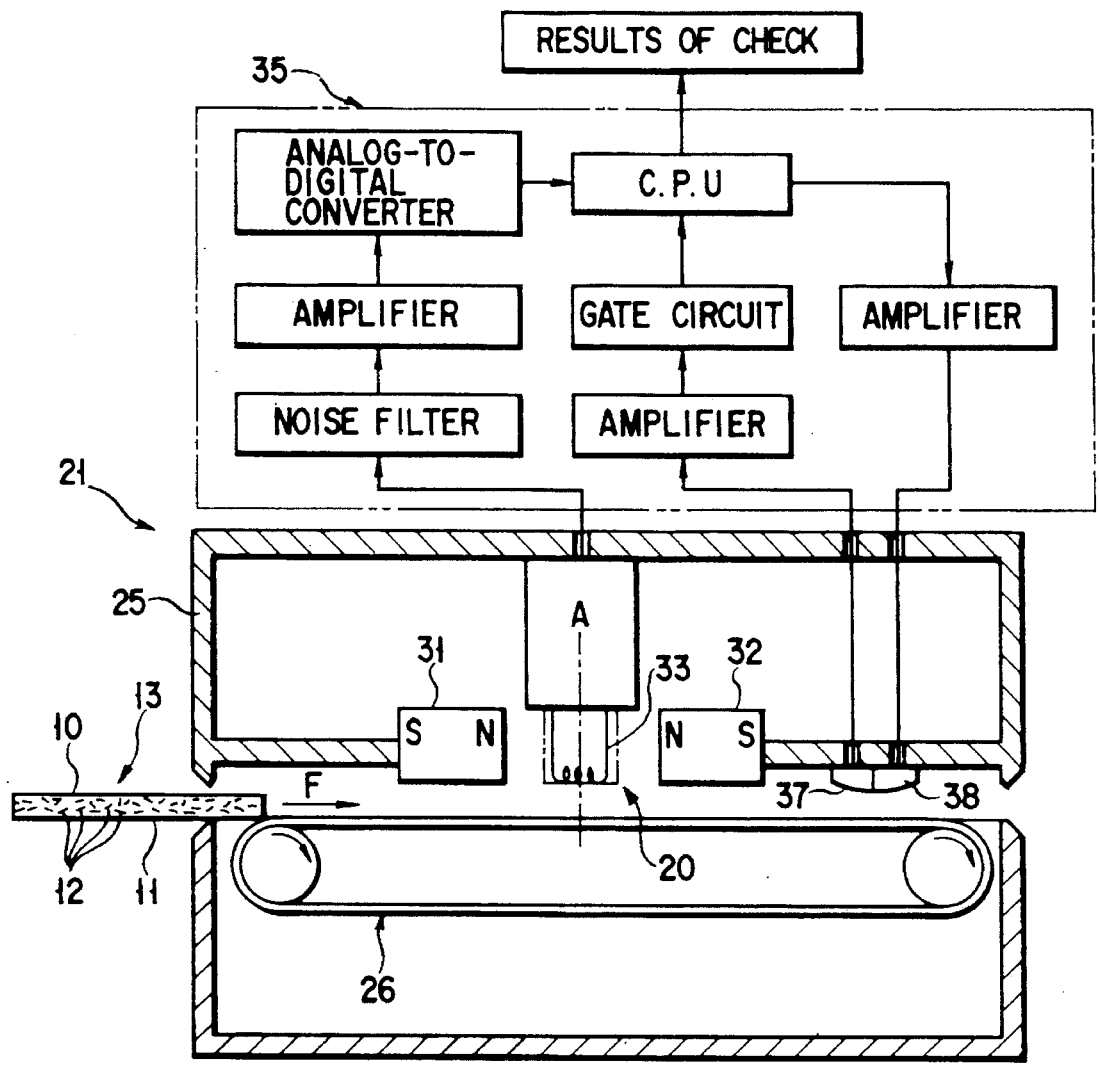
FIG. 1 is a side view, partially in section, showing an outline of a processing apparatus according to an embodiment of the present invention.

As the checking object 10 is moved in the direction of arrow F of FIG. 1 by the transportation mechanism 26, the scanning region 13 is first given an external magnetic field of a first direction generated by the first magnetic field generator 31. The intensity of this external magnetic field decreases with distance from the generator 31. As the scanning region 13 approaches the second magnetic field generator 32, the intensity of a second external magnetic field of the opposite direction increases. The intensity of the second field ranges from 0.1 to 10 Oe at the point A. The moment each minute portion of the scanning region 13 passes through the point A, therefore, the bistable magnetic devices 12 undergo a flux reversal attributable to the Large Barkhausen effect, and steep magnetic pulses are generated one after another.

Figure 3:
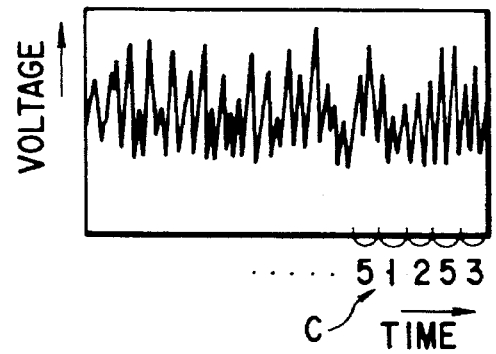
FIG. 3 is a diagram showing a pattern of an output voltage produced as the checking object is scanned.

Thus, a voltage output pattern such as the one shown in FIG. 3 is obtained if these magnetic pulses are detected as changes of electromagnetic induction voltage by means of the sensor coil 33. Although the checking object 10 is moved in the case of the processing apparatus 21, the same output pattern can be also obtained by moving the magnetic field generators 31 and 32 and the sensor coil 33 without moving the object 10.

Figure 4:
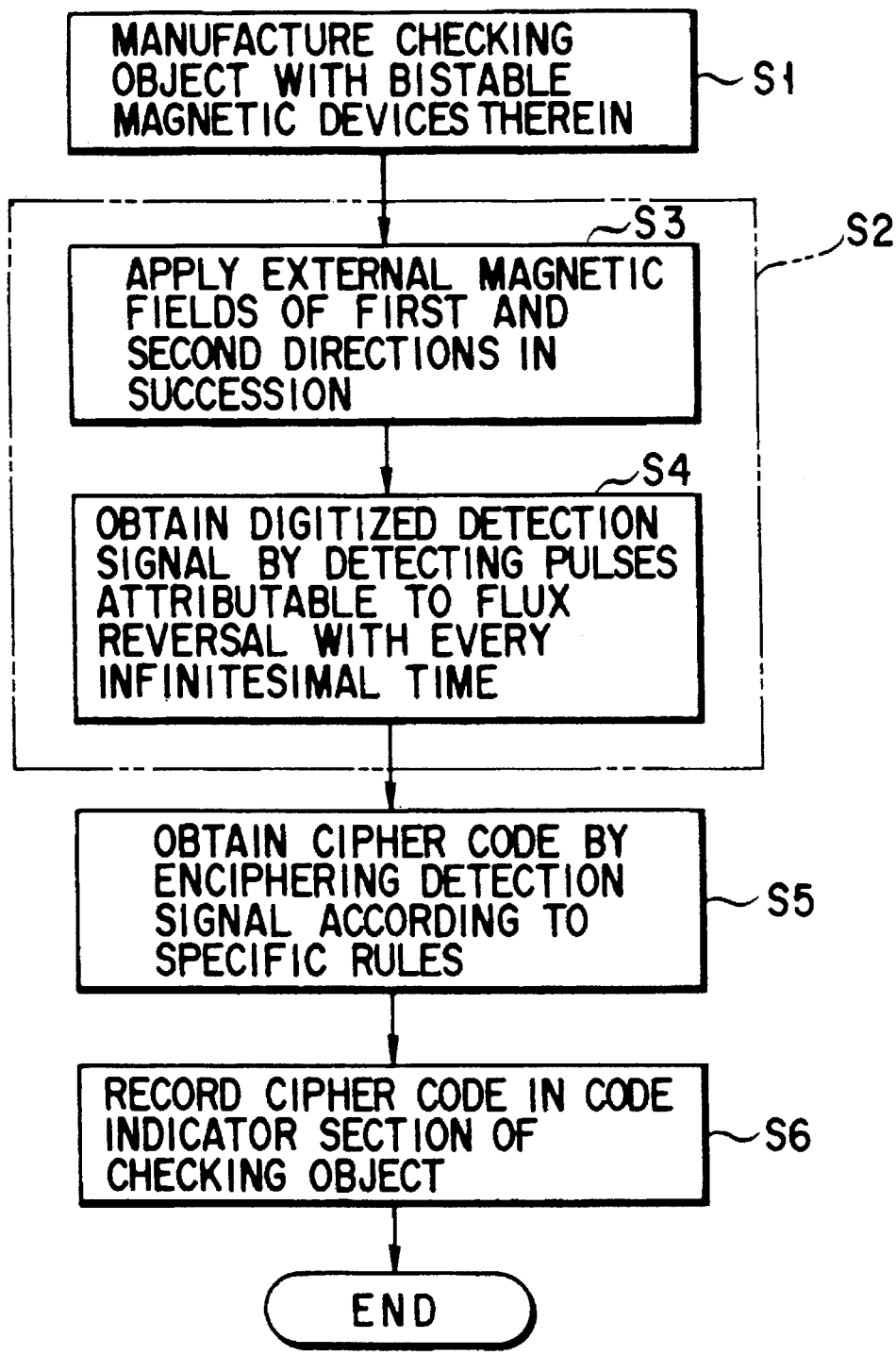
FIG. 4 is a flow chart showing a process for manufacturing the checking object.

FIG. 4 shows an outline of a process for manufacturing the checking object 10. In Step S1, the bistable magnetic devices 12 are dispersed into the base 11 of the object 10 as the base 11 is manufactured. In Step S2 for scanning, the object 10 is moved in the direction of arrow F at a predetermined speed by means of the transportation mechanism 26. Step S2 includes Step S3 for magnetization and Step S4 for detection.

As the minute portions of the scanning region 13 successively pass through the first magnetic field generator 31, in Step S3 for magnetization, the respective magnetic fields of the bistable magnetic devices 12 within the scanning region 13 are oriented in one direction by the magnetic field from the generator 31. The moment each minute portion of the scanning region 13 passes through the point A, the magnetic devices 12 undergo a flux reversal, so that steep magnetic pulses are generated one after another. Accordingly, a proper electromagnetic induction voltage corresponding to the bistable magnetic devices 12 is generated in each minute portion of the scanning region 13. In this embodiment, the scanning region 13 is divided with every infinitesimal time (e.g., 0.1 msec) for sampling, and output voltage for the individual infinitesimal times are ranked in, for example, five stages and converted into digital values. Thus, a proper detection signal C encoded for each minute portion of the scanning region 13 can be obtained, as shown in FIG. 3.

This detection signal C is enciphered according to specific rules in Step S5 for encipherment. The resulting cipher code is recorded in the code indicator section 15 by means of a magnetic head of the code writing unit 37 in Step S6 for writing. Although the indicator section 15 of this embodiment is a magnetic stripe, the cipher code may be recorded in the form of a bar code in the indicator section 15 by means of, for example, a print head.

Figure 5:
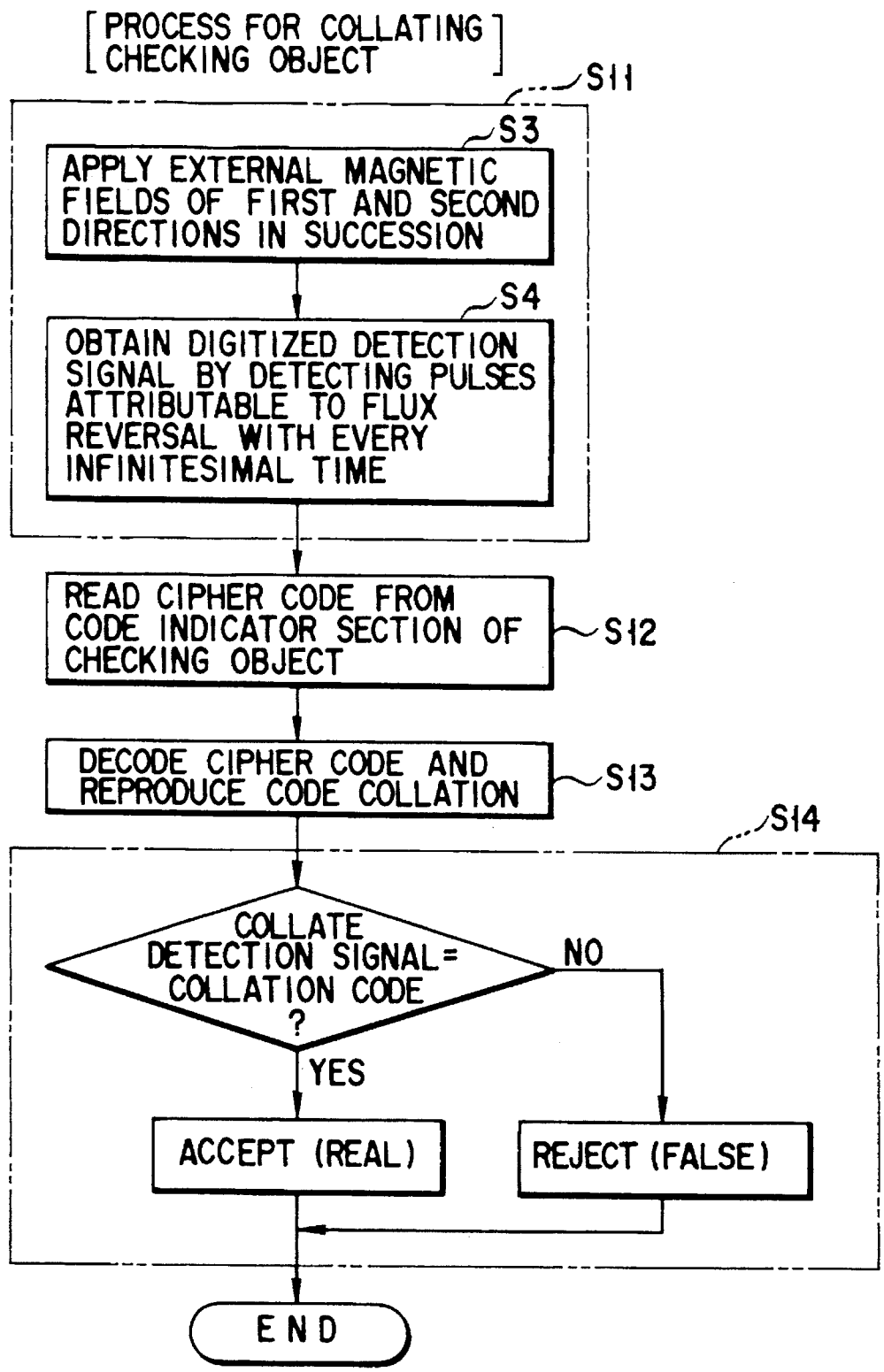
FIG. 5 is a flow chart showing a collating process for checking the authenticity of the checking object.

The authenticity of the checking object 10 can be also checked by using the processing apparatus 21. FIG. 5 shows an outline of a collating process for checking the authenticity of the object 10. Step S11 for scanning includes Step S3 for magnetization and Step S4 for detection, which are identical with those of the aforementioned process for manufacturing the checking object 10. A detection signal corresponding to the state of distribution of the bistable magnetic devices 12 are obtained by scanning the scanning region 13 at a predetermined speed.

In Step S12 for code reading, the cipher code recorded in the code indicator section 15 are read by means of the code reading unit 38. As this code is decoded according to specific rules in Step S13, a code for collation is reproduced. In Step S14 for discrimination, the collation code and the detection signal obtained in Step S4 for detection are compared, and it is concluded that the checking object 10 is real only when the code and the signal agree with each other.

In the processing apparatus 21, the external magnetic fields applied to the checking object 10 are extremely minute. Even though the cipher code and other informations are magnetically recorded in the code indicator section 15 or other areas, therefore, these magnetic informations can never be destroyed.

The authenticity of the checking object 10 may be also checked by using a processing apparatus 41 with a magnetic sensor 40 shown in FIG. 7. This processing apparatus 41 is provided with an alternating field generating coil 42 which serves both for initialization and for excitation. The frequency of an AC power source 45 which is connected to the coil 42 ranges, for example, from about 50 Hz to 1 kHz. In this processing apparatus 41, an alternating magnetic field acts on the scanning region 13. Thus, by applying the alternating field to the checking object 10 while moving the object in the direction of arrow F, the directions of magnetization of the bistable magnetic devices 12 are made uniform by the external magnetic field of the first direction, and thereafter, the direction of the external field is reversed or changed to the second direction. When the magnetic field intensity attains $H_B$ as each minute portion of the scanning region 13 passes through the point A, moreover, the magnetic pulses are generated by the Large Barkhausen effect. Electromagnetic induction voltage corresponding to the size of the magnetic pulses is detected by means of a coil 46. Also in this case, therefore, a proper detection signal can be obtained corresponding to the state of distribution of the bistable magnetic devices 12 within the scanning region 13.

As in the case of a checking object 10a shown in FIG. 8, the bistable magnetic devices 12 may be dispersed mainly in the scanning region 13. In this case, the loadings of the magnetic devices 12 can be made lower than in the case where the devices 12 are distributed throughout the checking object, thus entailing lower costs. In the code indicator section 15 of this modification, a cipher code is recorded in the form of a bar code.

According to the present invention, moreover, the bistable magnetic devices may be embedded in the back of the canvas of a picture, for example. In this case, a cipher code is recorded in a code indicator section, whereby the picture can be proved to be authentic. If the bistable magnetic devices according to the invention are embedded in art objects in three dimensions, furthermore, the original objects can be distinguished from imitations.

What is claimed is:

1. A checking object to be checked for authenticity, comprising:

a base formed of a nonmagnetic material;

a scanning region located in a specific position of the base;

a number of bistable magnetic wires which have respective diameters and lengths which are within predetermined ranges, and said bistable magnetic wires being dispersed at random in the scanning region so as to be oriented in many and unspecified directions and which produce a Large Barkhausen effect, said bistable magnetic wires being adapted to undergo a drastic flux reversal attributable to the Large Barkhausen effect when subjected in succession to first and second external magnetic fields of opposite directions; and a code indicator section, including a magnetically readable medium, provided in part of the base so that information for a proper flux reversal responsive to said bistable magnetic wires within the scanning region is encoded and recorded in the code indicator section by use of said magnetically readable medium.

2. A checking object according to claim 1, wherein each of said bistable magnetic wires is formed of a magnetic material having a near surface portion and a near center portion, said near surface and near center portions having different coercive forces.

3. A checking object according to claim 2, wherein each said bistable magnetic wires is formed of any magnetic material selected from a group of materials consisting of Ni—Fe alloy, Fe—Co—V alloy, Fe—Co- or Fe—B-based amorphous alloy, and Si—Fe single-crystal alloy.

4. A checking object according to claim 3, wherein said bistable magnetic wires each have a length in a range of from 5 mm to 20 mm and a diameter in a range of from 7 μm to 15 μm.

5. A checking object according to claim 1, wherein said magnetically readable medium of said code indicator section includes a magnetic stripe.

6. A checking object according to claim 1, wherein said bistable magnetic wires each have a length in a range of from 5 mm to 20 mm and a diameter in a range of from 7 μm to 15 μm.

7. A checking object to be checked for authenticity, comprising:

a base formed of a nonmagnetic material;

a scanning region located in a specific position of the base;

a number of bistable magnetic wires which have respective diameters and lengths which are within predetermined ranges, and said bistable magnetic wires being dispersed at random in the scanning region so as to be oriented in many and unspecified directions and which produce a Large Barkhausen effect, said bistable magnetic wires being adapted to undergo a drastic flux reversal attributable to the Large Barkhausen effect when subjected in succession to first and second external magnetic fields of opposite directions; and a code indicator section, including an optically readable medium, provided in part of the base so that information for a proper flux reversal responsive to said bistable magnetic wires within the scanning region is encoded and recorded in the code indicator section by use of said an optically readable medium.

8. A checking object according to claim 7, wherein each of said bistable magnetic wires is formed of a magnetic material having a near surface portion and a near center portion, said near surface and near center portions having different coercive forces.

9. A checking object according to claim 7, wherein each said bistable magnetic wires is formed of any magnetic material selected from a group of materials consisting of Ni—Fe alloy, Fe—Co—V alloy, Fe—Co- or Fe—B-based amorphous alloy, and Si—Fe single-crystal alloy.

10. A checking object according to claim 9, wherein said bistable magnetic wires each have a length in a range of from 5 mm to 20 mm and a diameter in a range of from 7 μm to 15 μm.

11. A checking object according to claim 7, wherein said optically readable medium of said code indicator section includes an optically readable bar code.

12. A checking object according to claim 7, wherein said bistable magnetic wires each have a length in a range of from 5 mm to 20 mm and a diameter in a range of from 7 μm to 15 μm.

\* \* \* \* \*